United States Patent
Gaillot et al.

(10) Patent No.: US 9,404,736 B2
(45) Date of Patent: Aug. 2, 2016

(54) DEFORMATION MEASUREMENT SENSOR OPERATING IN A HOSTILE ENVIRONMENT AND INCLUDING AN OPTICAL MOVEMENT MEASUREMENT MODULE, AND MEASUREMENT SYSTEM USING SAID SENSOR

(75) Inventors: Stéphane Gaillot, Vinon sur Verdon (FR); Nicolas Regazzoni, Aix en Provence (FR); Guy Cheymol, Bures sur Yvette (FR)

(73) Assignee: Commissariat a L'Energie Atomique et aux Energies Alternatives, Paris (FR)

( * ) Notice: Subject to any disclaimer, the term of this patent is extended or adjusted under 35 U.S.C. 154(b) by 73 days.

(21) Appl. No.: 14/238,730

(22) PCT Filed: Aug. 9, 2012

(86) PCT No.: PCT/EP2012/065556
§ 371 (c)(1),
(2), (4) Date: Jun. 17, 2014

(87) PCT Pub. No.: WO2013/023976
PCT Pub. Date: Feb. 21, 2013

(65) Prior Publication Data
US 2014/0293269 A1    Oct. 2, 2014

(30) Foreign Application Priority Data

Aug. 12, 2011 (FR) ...................... 11 57324

(51) Int. Cl.
*G01B 11/16* (2006.01)
*G01B 9/02* (2006.01)

(52) U.S. Cl.
CPC ............ *G01B 11/161* (2013.01); *G01B 9/0205* (2013.01); *G01B 9/02057* (2013.01); *G01B 11/18* (2013.01)

(58) Field of Classification Search
CPC ............ G01B 9/0205; G01B 9/02057; G01B 11/161; G01B 11/18; E21B 47/06; E21B 47/065; E21B 47/123; G01V 8/00; G01V 8/10; G01V 8/12; G01V 8/14; G01V 8/16
See application file for complete search history.

(56) References Cited

U.S. PATENT DOCUMENTS

| 6,269,198 B1 * | 7/2001 | Hodgson ................. G01V 1/52 356/478 |
| 2002/0196993 A1 * | 12/2002 | Schroeder ............... G01L 1/246 385/12 |

(Continued)

FOREIGN PATENT DOCUMENTS

| DE | 35 03 007 A1 | 7/1986 |
| EP | 1 624 278 A1 | 2/2006 |
| EP | 2 145 781 A1 | 1/2010 |
| JP | S63-259403 A | 10/1988 |

OTHER PUBLICATIONS

International Search Report and Written Opinion in PCT/EP2012/065556, European Patent Office, Rijswijk, NL, dated Sep. 13, 2012.

(Continued)

*Primary Examiner* — Michael A Lyons
(74) *Attorney, Agent, or Firm* — Nixon Peabody LLP; Khaled Shami

(57) ABSTRACT

Deformation measurement sensor operating in a hostile environment and including an optical movement measurement module, and measurement system using said sensor.
The sensor includes: an enclosure comprising an opening; a movable element having a first surface that is brought into contact with an object (4) that can deform, for example a nuclear fuel rod, and a second surface that is reflective and extends into the enclosure through the opening; a sealed, resilient connecting component performing a return function between the element and the enclosure; and, inside the enclosure, a module for creating an interference light using a light reflected by the second surface of the element. Deformation of the object results in a modification to the interference light that is representative of the deformation.

10 Claims, 2 Drawing Sheets

(56) References Cited

U.S. PATENT DOCUMENTS

2007/0292071 A1* 12/2007 Zerwekh ............... E21B 47/06
 385/12
2012/0211650 A1* 8/2012 Jones ..................... E21B 49/10
 250/269.1

OTHER PUBLICATIONS

International Preliminary Examination Report in PCT/EP2012/065556, European Patent Office, Rijswijk, NL, dated Oct. 21, 2013.
Search Report in French Patent Application No. 1157324 dated Mar. 9, 2012.

* cited by examiner

DEFORMATION MEASUREMENT SENSOR OPERATING IN A HOSTILE ENVIRONMENT AND INCLUDING AN OPTICAL MOVEMENT MEASUREMENT MODULE, AND MEASUREMENT SYSTEM USING SAID SENSOR

CROSS REFERENCE TO RELATED APPLICATIONS

This application is the national stage of International Application No. PCT/EP2012/065556, filed Aug. 9, 2012, entitled, "Deformation Measurement Sensor Operating In A Hostile Environment And Including An Integrated Optical Movement Measurement Module, And A Measurement System Using Said Sensor," which claims the benefit of priority of French Patent Application No. 11 57324, filed Aug. 12, 2011, the contents of which are incorporated herein by reference in their entirety.

TECHNICAL FIELD

The present invention relates to a deformation measurement sensor, capable of operating in a hostile environment, and including an optical movement measurement module.

This sensor makes it possible to measure in real time, in situ and in severe conditions of use (for example in a fluid of which the pressure and/or the temperature are high, or in a zone exposed to a flux of neutrons and gamma photons), the phenomena of deformation of an object that is subjected to diverse loads (for example: temperature, pressure, heating by gamma radiation or wear).

This sensor finds applications in various industrial fields, in particular the nuclear and petrochemical fields. For example, in the nuclear field, this sensor applies to the measurement of the swelling of the cladding of a fuel rod placed in an irradiation device. But it can also be adapted to the measurement of other types of deformation, for example to the measurement of the lengthening of a fuel rod exposed to a neutron flux.

In fact, in a large number of industrial systems, certain components can be subjected to diverse loads which can lead to their deformation. For example, the swelling of a nuclear fuel rod, exposed to an increasing neutron flux, can reach 10% of its diameter.

When the deformation is too considerable, the components can cease to operate and even be destroyed. It is thus useful to be able to measure their deformation in real time, especially since a return to normal operating conditions may lead to the disappearance of the phenomenon of deformation (case of expansion for example) or only provide overall information on the phenomenon (case of wear of a component for example).

STATE OF THE PRIOR ART

A deformation sensor that uses a Fabry-Perot interferometer (which interacts with a light beam) is already known. On the other hand, the arrangement of the surfaces for reflecting the light beam (along the axis of the optical fibre, used with the sensor) and the extent of the deformation measurement that can be attained by this type of sensor (at least ten times lower than that which is sought (from 0.1 mm to several millimeters)) do not enable its use for the aforementioned application, namely the measurement of the swelling of a nuclear fuel rod under irradiation.

DESCRIPTION OF THE INVENTION

The aim of the present invention is to overcome these drawbacks.

The sensor, the subject matter of the invention, makes it possible to measure radial deformations, for example swellings. It is capable of operating in conditions of high pressure and high temperature. And it makes it possible to measure deformations ranging from 0.1 mm to several millimeters, with a precision of the order of 10 micrometers.

The measurement is based on a real time interferometry method, implemented by means of an optical module positioned in an enclosure that is isolated from the external environment.

Precisely, the present invention relates to a deformation measurement sensor, capable of operating in a hostile environment, characterised in that it includes:

an enclosure, comprising an opening,
a movable element that has opposite first and second surfaces and which can be moved with respect to the enclosure along a first axis meeting the first and second surfaces, the first surface being intended to be brought into contact with an object liable to deform, the second surface being capable of extending into the enclosure through the opening thereof and to reflect an incident light,
a sealed, resilient connecting component, performing a return function between the movable element and the enclosure,
and
an optical module, placed inside the enclosure, for creating an interference light along a second axis that is not parallel to the first axis, using an auxiliary light, reflected by the second surface of the movable element,
such that a deformation of the object results in a modification of the interference light, representative of the deformation.

According to a preferred embodiment of the deformation measurement sensor, the subject matter of the invention, the first and second axes are perpendicular.

Preferably, the optical module includes a semi-reflecting mirror and a reflecting surface that cooperate with the second surface of the movable element to form a Michelson type interferometer.

According to a preferred embodiment of the invention, the measurement sensor includes a connection bellows between the movable element and the enclosure.

Preferably, in this case, the deformation measurement sensor further includes a device for pressurising the enclosure by a gas, to equalise the pressure between the inside and the outside of the enclosure.

According to a preferred embodiment, the deformation measurement sensor further includes a first tube connected in a sealed manner to the enclosure, extending along the second axis and enabling the circulation of the interference light and the auxiliary light, intended to generate the interference light by means of the optical module.

In this case, preferably, the deformation measurement sensor further includes an optical fibre that extends into the first tube to transmit the auxiliary light and the interference light.

A part of the optical fibre is preferably curved into the first tube so as to form therein an expansion loop.

Advantageously, the pressurisation device includes:
a second tube connected in a sealed manner to the first tube and provided to supply the enclosure with gas via the first tube, and a non-return valve mounted on the second tube, to prevent the passage of the hostile environment in the event of loss of sealing of the enclosure.

It is also preferable to provide the deformation measurement sensor with a sealing device between the optical fibre and the inner wall of the first tube, opposite the enclosure with respect to the connection zone between the first and second tubes, to prevent the passage of the hostile environment in the event of loss of sealing of the enclosure.

The present invention also relates to a system for measuring the deformation of an object, comprising:
- the deformation measurement sensor, the subject matter of the invention,
- a source of auxiliary light, and
- a device for treating the interference light to determine the deformation.

BRIEF DESCRIPTION OF THE DRAWINGS

The present invention will be better understood on reading the description of embodiment examples given hereafter purely as an indication and in no way limiting, while referring to the appended drawings in which.

DETAILED DESCRIPTION OF PARTICULAR EMBODIMENTS

Figure 1:
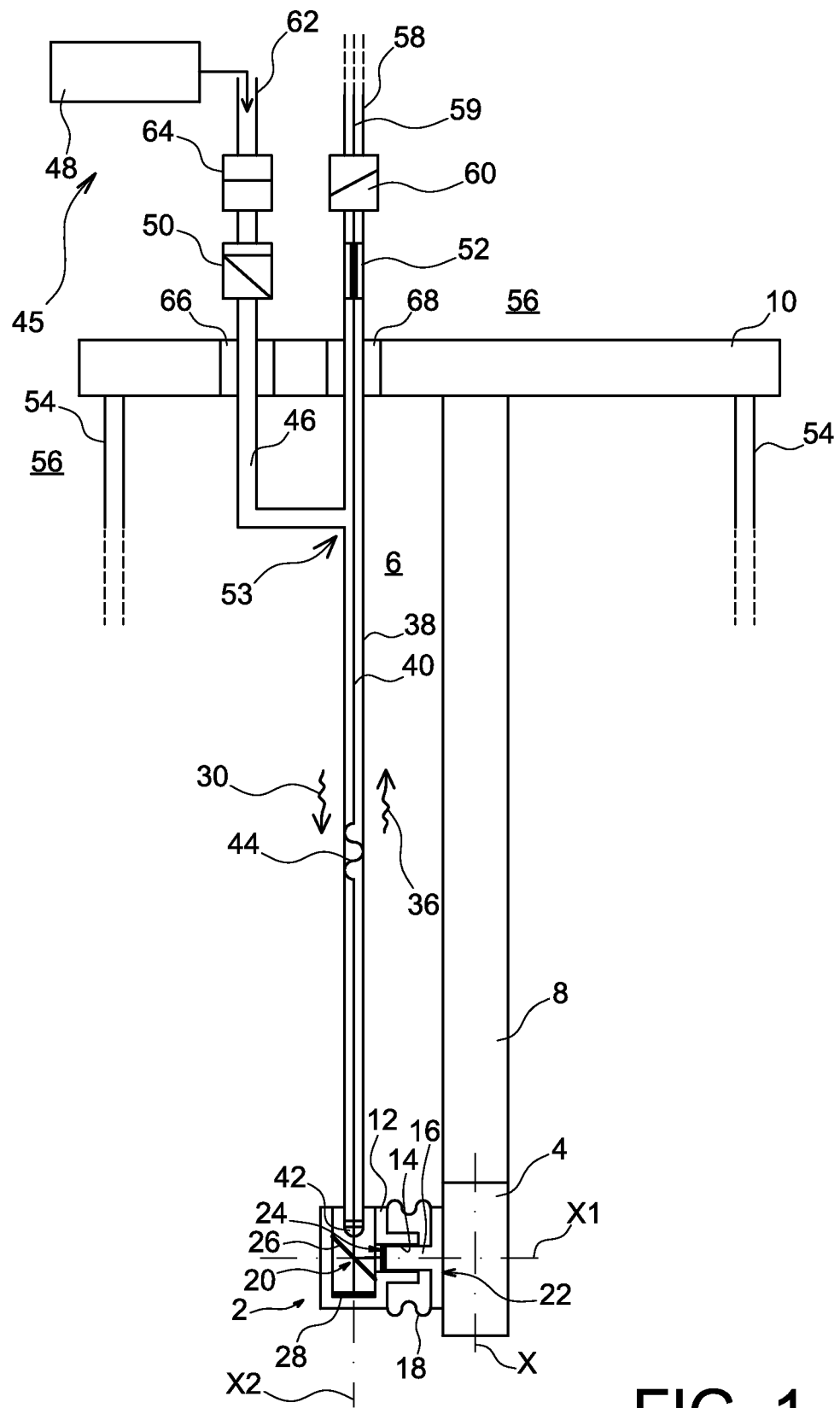
FIG. 1 is a schematic longitudinal sectional view of a particular embodiment of the deformation measurement sensor, the subject matter of the invention.

In the example of the invention, which is schematically represented in FIG. 1, the sensor 2 is used to measure the radial deformation of a sample 4 that extends along a vertical axis X in a hostile environment 6, for example water pressurised at high temperature. This sample 4 is fixed at the lower end of a sample holder 8. The upper end thereof is fixed to a plate 10 constituting the head of the sample holder.

The sensor 2 is also in the hostile environment 6 and includes:
- an enclosure 12 comprising a cylindrical opening 14 that extends along an axis X1 perpendicular to the axis X,
- a movable element 16 that slides in the opening 14 along the axis X1,
- a connecting component 18, to connect the movable element 16 to the enclosure 12 in a resilient and sealed manner, and
- an optical module 20.

The first surface 22 of the movable element 16 (radial sensor) is brought into contact with the sample 4, and its second surface 24 lies inside the enclosure 12. This second surface 24 (measurement surface) is capable of reflecting an incident light that is used to determine the deformation of the sample.

In the example described, the connecting component 18 is a bellows that surrounds the cylindrical opening 14 and the two ends of which are respectively fixed in a sealed manner to the enclosure 12 and to the movable element 16.

The optical module 20 is placed inside the enclosure 12. It includes a semi-reflecting mirror 26 and a reflecting surface 28 (reference surface) which is arranged at the bottom of the enclosure 12. The semi-reflecting mirror 26 and the reflecting surface 28 cooperate with the second surface 24 of the movable element 16 to form a Michelson type interferometer.

The reflecting surface 24 of the movable element 16 is perpendicular to the axis X1. The reflecting surface 28 is perpendicular to another axis X2 that is perpendicular to the axis X1. The semi-reflecting mirror 26 forms a 45° angle with each of the axes X1 and X2 as may be seen in FIG. 1.

More precisely, the optical module 20 uses a light 30 that propagates along the axis X2 (downwards in FIG. 1). Part of this light 30 is reflected by the semi-reflecting mirror 26 along the axis X1 and is reflected on the reflective surface 24 of the movable element 16 in the direction of the semi-reflecting mirror 26. The latter reflects a part ("first part" hereafter) thereof upwards along the axis X2.

Another part of the light 30 is transmitted by the semi-reflecting mirror 26 and is reflected on the reflecting surface 28 in the direction of the semi-reflecting mirror 26. The latter transmits a part ("second part" hereafter) thereof upwards along the axis X2.

The first and second parts interfere to form an interference light 36 which propagates upwards along the axis X2.

Thus, any radial deformation of the sample 4 results in a modification of the interference light 36 (variation in the difference of optical path between the light beam that is reflected on the fixed surface 28, and that which is reflected on the movable surface 24). This modification is representative of the radial deformation. The latter may thus be determined by an appropriate treatment of the interference light 36. We will return to this question in the description of FIG. 2.

The sensor 2 is provided with a metal tube 38 that is connected in a sealed manner to the enclosure 12. The tube 38 extends vertically along the axis X2 and passes through the plate 10 as may be seen in FIG. 1. Said tube 38 enables the circulation of the lights 30 and 36.

The sensor 2 is also provided with an optical fibre 40 that extends along the axis X2 in the tube 38 to transmit these lights 30 and 36. As may be seen, a collimation lens 42 is provided inside the enclosure 12, facing the lower end of the optical fibre 40.

In the example described, the hostile environment 6 is water pressurised at high temperature. The measurement of the deformation of the sample 4 is thus carried out hot. One then provides a device for managing the differential expansion between the optical fibre 40 and the metal tube 38. This device is an expansion loop 44 which is obtained by bending the optical fibre 40 in an appropriate manner in the tube 38.

Purely as an indication and in no way limiting, the pressure of the water is equal to 15.5 MPa (155 bars) and its temperature is equal to 320° C.

One then provides the sensor 2 with a device 45 for pressurising the enclosure 12 by a gas, in order to equalise the pressure between the inside and the outside of the enclosure 12. One thereby avoids pre-stressing the bellows 18 and the sensitivity of the deformation measurement is improved.

This pressurisation device 45 includes another tube 46, one end of which is connected in a sealed manner to the tube 38 and which also passes through the plate 10. As may be seen, at the other end of the tube 46, means 48 are provided to supply with gas this tube 46 (and thus the tube 38 as well as the enclosure 12). The gas used is for example nitrogen.

Furthermore, in the event of failure of the sealing of the enclosure 12, and to avoid any untimely rise of fluid (pressurised hot water), one provides the tube 46 with a non-return valve 50. In addition, a sealing instrument 52 is provided between the optical fibre 40 and the inner wall of the tube 38, opposite the enclosure 12 with respect to the zone 53 where the tubes 38 and 46 are connected.

In certain cases, the hostile environment 6 has itself to be isolated from a surrounding external environment 56 and separated therefrom. To do so, an enclosure 54 is provided to confine the hostile environment 6. This enclosure 54 is only sketched in FIG. 1. It is connected in a sealed manner to the plate 10.

The enclosure 54 (containing the medium 6, the sample 4 and the sensor 2) is then immersed in the surrounding external environment 56 and means not represented are provided to introduce the hostile environment 6 inside the enclosure 54 and to control the state thereof (for example the temperature and the pressure in the case where the hostile environment is water pressurised at high temperature).

The tube 38 is then connected to another tube 58, in which is located another optical fibre 59, by means of a suitable connector 60 enabling the sealing vis-à-vis the surrounding external environment 56 and the optical connection between the fibres 40 and 59.

Similarly, the tube 46 is connected to another tube 62 via which the tube 46 is supplied with gaz. The link between the tubes 46 and 62 is assured by a suitable connector 64, enabling the sealing vis-à-vis the surrounding external environment 56 and the passage of the gas.

In addition, to guarantee the sealing between the hostile environment 6 and the surrounding external environment 56, the plate 10 is provided with sealed passages 66 and 68 in the zones where it is respectively traversed by the tubes 38 and 46.

Figure 2:
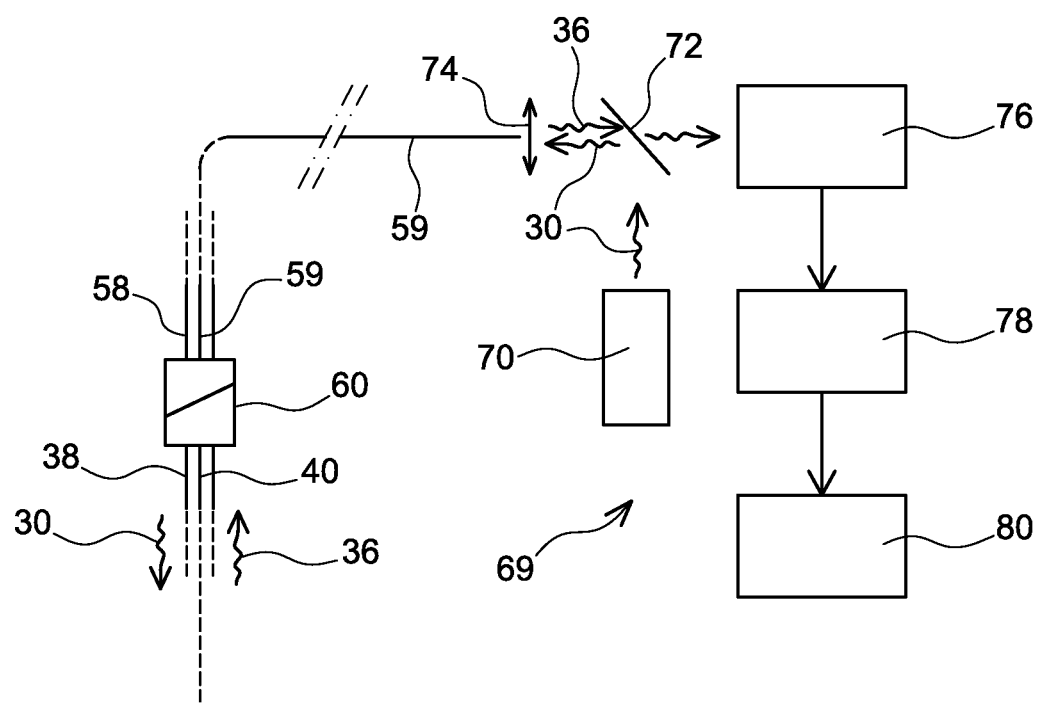
FIG. 2 is a schematic view of an example of the deformation measurement system, the subject matter of the invention, using the deformation measurement sensor represented in FIG. 1.

FIG. 2 is a schematic and partial view of an example of the measurement system, the subject matter of the invention. The system 69 represented in this FIG. 2 uses the sensor 2 represented in FIG. 1, supplies it with light 30 and treats the interference light 36 to determine the deformation of the sample 4.

This system includes a light source 70 that generates the light 30, for example a white light, that is injected into the optical fibre 59 via a semi-reflecting mirror 72 and a suitable lens 74.

The system 69 also includes:
- a spectrometer 76 which receives, via the semi-reflecting mirror 72 and the lens 74, the interference light 36 transmitted by the fibre 59,
- a computer 78 that processes the signals from the spectrometer 76 to determine, in real time, the sought after deformation, and
- a device 80 for displaying the results of the measurements thereby carried out.

The invention claimed is:

1. Deformation measurement sensor, capable of operating in a hostile environment comprising:
    an enclosure, comprising an opening,
    a movable element that has opposite first and second surfaces and which can be moved with respect to the enclosure along a first axis meeting the first and second surfaces, the first surface being intended to be brought into contact with an object liable to deform, the second surface being capable of extending into the enclosure through the opening thereof and reflecting an incident light,
    a sealed, resilient bellows, performing a return function between the movable element and the enclosure, and
    an interferometer, placed inside the enclosure, for creating an interference light along a second axis which is not parallel to the first axis, using an auxiliary light, reflected by the second surface of the movable element,
    such that a deformation of the object results in a modification of the interference light, representative of the deformation.

2. Deformation measurement sensor according to claim 1, in which the first and second axes are perpendicular.

3. Deformation measurement sensor according to claim 1, in which the interferometer includes a semi-reflecting mirror and a reflecting surface which cooperate with the second surface of the movable element to form a Michelson interferometer.

4. Deformation measurement sensor according to claim 1, further comprising a pressurization device for pressurizing the enclosure by a gas, to equalize the pressure between the inside and the outside of the enclosure.

5. Deformation measurement sensor according to claim 1, further comprising a first tube connected in a sealed manner to the enclosure, extending along the second axis and enabling the circulation of the interference light and the auxiliary light, intended to generate the interference light by means of the optical module.

6. Deformation measurement sensor according to claim 5, further comprising an optical fibre that extends into the first tube to transmit the auxiliary light and the interference light.

7. Deformation measurement sensor according to claim 6, in which a part of the optical fibre is curved into the first tube so as to form therein an expansion loop.

8. Deformation measurement sensor according to claim 5, further comprising a device for pressurizing the enclosure by a gas, to equalize the pressure between the inside and the outside of the enclosure, and in which the pressurization device includes:
    a second tube connected in a sealed manner to the first tube and provided to supply the enclosure with gas via the first tube, and
    a non-return valve mounted on the second tube, to prevent the passage of the hostile environment in the event of loss of sealing of the enclosure.

9. Deformation measurement sensor according to claim 8, further comprising a sealing instrument between an optical fibre that extends into the first tube to transmit the auxiliary light and the interference light and the inner wall of the first tube, opposite the enclosure with respect to the connection zone between the first and second tubes, to prevent the passage of the hostile environment in the event of loss of sealing of the enclosure.

10. System for measuring the deformation of an object, comprising:
    an enclosure with an opening,
    a movable element that has opposite first and second surfaces and which can be moved with respect to the enclosure along a first axis (X1) meeting the first and second surfaces, the first surface being movable into contact with an object liable to deform, the second surface being extendable into the enclosure through the opening thereof and reflecting an incident light,
    a sealed, resilient bellows for performing a return function between the movable element and the enclosure, and
    an interferometer for placement inside the enclosure, for creating an interference light along a second axis (X2) which is not parallel to the first axis (X1), using an auxiliary light which is reflected by the second surface of the movable element, such that a deformation of the object results in a modification of the interference light, representative of the deformation;
    a source of auxiliary light, and
    a sensor for treating the interference light to determine the deformation.

* * * * *